Figure 1:
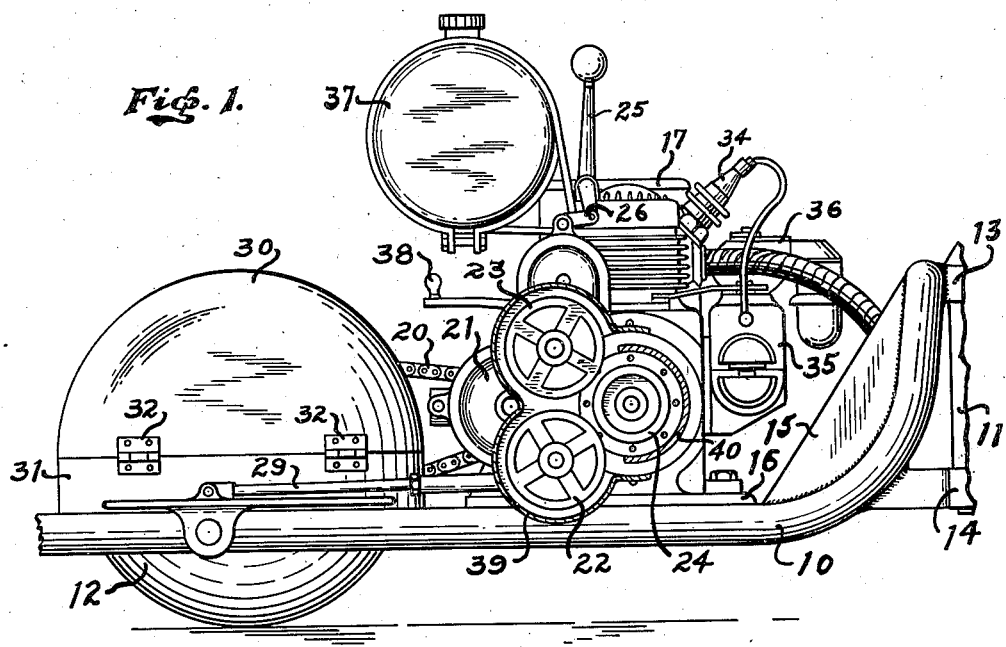

Nov. 11, 1947.  J. L. WATERS  2,430,625
REVERSING DRIVE MECHANISM
Filed Jan. 25, 1944  2 Sheets-Sheet 1

INVENTOR.
JOHN LANDON WATERS.
BY
*H. H. Atkinson*
ATTORNEY

Nov. 11, 1947.  J. L. WATERS  2,430,625
REVERSING DRIVE MECHANISM
Filed Jan. 25, 1944  2 Sheets-Sheet 2
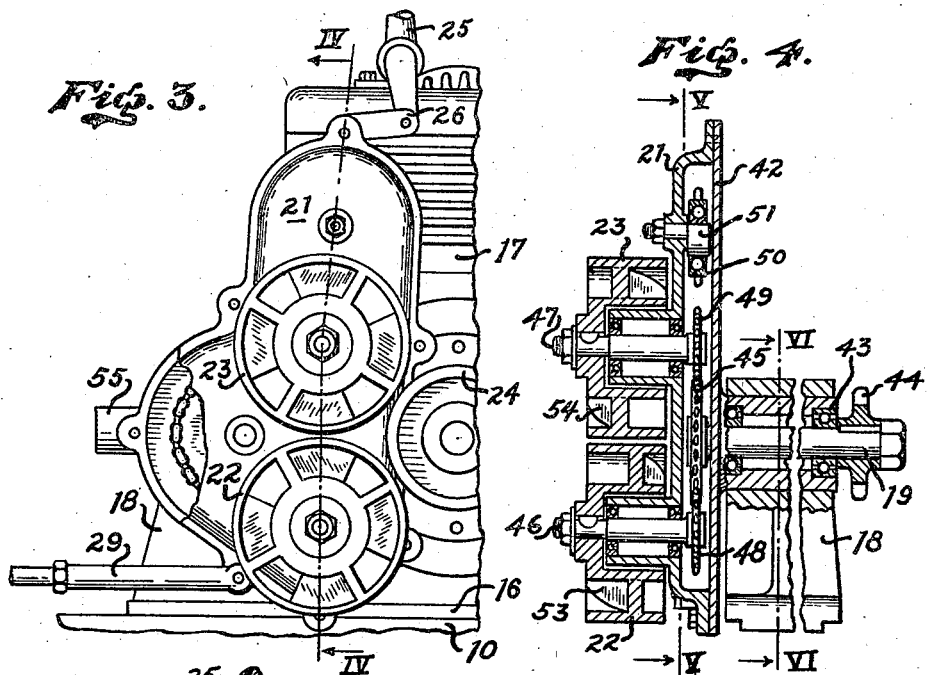
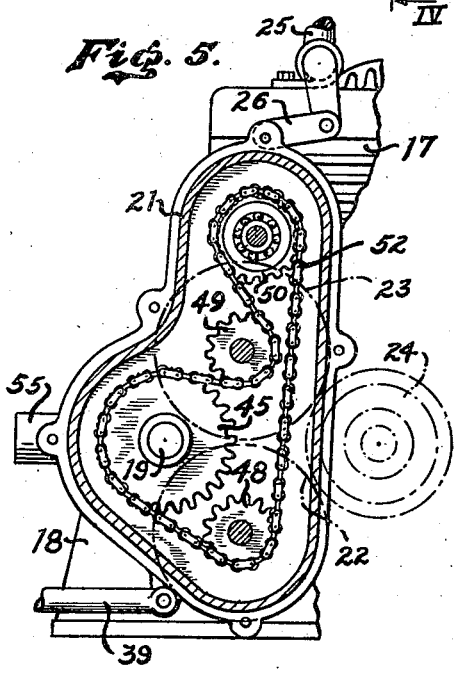
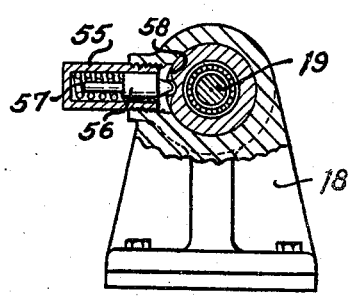
INVENTOR.
JOHN LANDON WATERS
BY
Wm H Atkinson
ATTORNEY Patented Nov. 11, 1947

2,430,625

UNITED STATES PATENT OFFICE 2,430,625

REVERSING DRIVE MECHANISM

John Landon Waters, Salem, Oreg., assignor, by mesne assignments, to Xpediter Corporation, Seattle, Wash., a corporation of Washington Application January 25, 1944, Serial No. 519,606

5 Claims. (Cl. 74—220)

My present invention relates to motor propelled vehicles, and more particularly to an improved drive and controlling means for a vehicle or an industrial truck of the type illustrated and described in my previously issued Patent No. 2,377,389, dated June 5, 1944, and entitled Motorized hand truck.

An object of the invention is to provide a new, novel and practical control for a power propelled vehicle or an industrial truck of the type having a single supporting and/or driving wheel at the trailing end thereof.

Another object of the invention is to provide a simple and effective connecting means for the drive of a motor propelled vehicle with which the vehicle may be started, stopped and reversed by an operation of said means and without resort to any braking means.

Another object of the invention is to provide a simple and inexpensive reversible power transmitting drive for a power driven vehicle or truck having a single driving and/or supporting wheel by which an operator riding astride the rear wheel may control the vehicle with foot action while his hands are free to effect a steering of the vehicle.

Other objects and advantages of the invention will be in part evident to those skilled in the art and in part pointed out hereinafter in the following description taken in connection with the accompanying drawings, wherein there is shown by way of illustration and not of limitation a preferred embodiment thereof.

Figure 2:
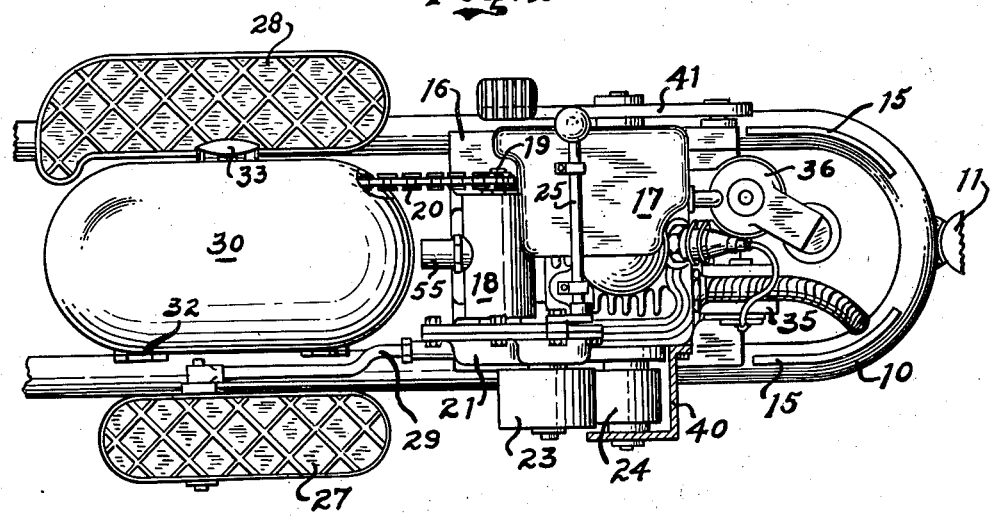

In the drawings:

Figure 1 is a fragmentary side view showing my improved driving and controlling means as applied to an industrial truck of the type shown and described in my aforementioned copending application, Figure 2 is a plan view of the truck as shown in Figure 1, Figure 3 is a fragmentary side elevation of my improved device with parts broken away, Figure 4 is a substantially vertical sectional view taken along line IV—IV of Figure 3, looking in direction of arrows, Figure 5 is a fragmentary sectional view of the device taken along line V—V of Figure 4, looking in direction of arrows, and Figure 6 is a partial sectional view taken along line VI—VI of Figure 4, looking in direction of arrows.

Upon referring to Figures 1 and 2 of the drawings, it will be noted that my present invention is illustrated as applied to an industrial vehicle or truck of the type disclosed in my above identified patent. In these views the numeral 10 designates a chassis or frame which in this particular type of truck moves in trailing relation with a forwardly disposed steerable portion to which it is attached by means of a substantially vertical spindle assembly 11. This forward steerable portion will be found more particularly described in my above patent, and since this feature forms no part of the present invention, it may, for the purposes of this disclosure, be only briefly described as comprising a forward steerable frame portion (not shown) which is articulately attached to the chassis or frame 10 by means of the spindle assembly 11. This steerable frame portion has a transversely extending axle upon the ends of which two spaced forward supporting wheels are mounted, and extending rearwardly from this frame portion there is a means by which the vehicle or truck may be steered by an operator riding astride a rear chassis driving or supporting wheel, designated by the numeral 12. The driving wheel 12 is here shown as supported upon a transverse axle that extends between the rear ends of the chassis or frame 10. In these views the chassis 10 is also shown as formed of tubing bent into a substantially U-shaped configuration and which is turned up at its forward end so as to connect with the spindle assembly 11 at its upper and lower ends through spindle engaging bosses 13 and 14 extending therefrom. The chassis 10 is also reenforced at its forward end by means of diagonally disposed webs 15 that are welded thereto. Intermediate its ends the chassis or frame 10 carries a foundation plate 16 upon which a power producing unit, such as an internal combustion engine, designated generally by the numeral 17, is adjustably secured. At its rear end the foundation plate 16 supports a bearing pedestal 18 in which is journaled a transversely extending power take-off or driving shaft 19, as will be described hereinafter in more detail. Extending from the driving shaft 19 there is a driving chain 20 that connects with a sprocket which is connected to the driving wheel 12 in the conventional manner. Also journaled upon the pedestal 18, and for a limited rocking movement about the axis of the driving shaft 19, there is an enclosing housing 21 which carries externally disposed forward and reverse travel producing cylindrical members, respectively designated by the numerals 22 and 23. These travel producing cylindrical members 22 and 23, as will hereinafter appear, are adapted, by a rocking of the enclosing housing 21, to be moved into and out of engagement with a cylindrical power delivery means 24 that is driven in a continuous and unidirectional manner by the power producing internal combustion engine 17. For the purpose of rocking the enclosing housing 21 and thus bring the forward or reverse travel producing cylindrical members 22 and 23 into and out of engagement with the cylindrical power delivery means 24, there is an upwardly extending manually operable lever 25 that is connected to the upper end of the enclosing housing 21 by a link 26. The lever 25 is shown as journaled upon a transverse axis so that it may be moved backward and forward by the hand of an operator and rock the enclosing housing 21 about its journaled support upon the pedestal 18. This lever 25 will be found convenient for jogging or moving the vehicle or truck for small distances, as when the operator is manipulating same to engage and/or discharge a load. As an additional means for controlling the rocking movement of the enclosing housing 21, the chassis 10 is also shown as provided with a rockable platform 27 that is located at one side of the driving wheel 12 and from which there extends an operating connection or rod 29 that connects with a lower part of the enclosing housing 21. At the other side of the driving wheel 12 the chassis 10 carries a second platform 28 which, in this embodiment, is shown as fixed upon the chassis and somewhat larger than the rockable foot platform 27. With these platforms 27 and 28 arranged as shown, it will be readily seen that an operator may ride thereupon astride the driving wheel 12 in a position where he can, by a rocking of the foot platform 27, cause the enclosing housing 21 to be rocked upon its journaled support upon the pedestal 18 and thus selectively move one or the other of the travel producing cylindrical members 22 and 23 into cooperatinng engagement with the cylindrical power delivery means 24 and thus effect either a forward or reverse travel of the vehicle or truck as a whole. To protect the operator, the chassis 10 is also shown as provided with a rear wheel enclosing housing 30 which is hinged at one side upon a base portion 31 by means of hinges 32 so as to completely enclose the driving wheel 12, and at its other side it is secured in place by a spring latch 33.

Before proceeding with a more detailed description of the improved drive and controlling means, it may be stated that the prime mover driving unit, here shown as an internal combustion engine 17, is provided with all of the conventional accessories, such as a spark plug 34, magneto 35, carburetor 36, and a fuel tank 37. And in addition to these elements there is also provided a throttle controlling lever 38 by means of which the speed of the internal combustion engine 17 may be controlled in the conventional manner. Supported upon an extending portion of the crank case of the internal combustion engine 17, there is, as shown in Figure 1, a guard or housing 39 that cooperates with a shield 40 upon the engine 17 to completely enclose the cylindrical power delivery means 24 and the forward and reverse travel producing cylindrical members 22 and 23. This housing 39 is stationary and of a size sufficient to permit the required rocking movements of the travel producing cylindrical members 22 and 23 as the enclosing housing 21 is rocked to establish a driving connection between the internal combustion engine 17 and the power driving shaft 19. As is more particularly shown in Figure 2 of the drawings, there is also a kick starting lever 41 by means of which the combustion engine 17 may be cranked in starting, as is the practice with engines of this character. In this latter figure the fuel tank 37 and the throttle controlling lever 38 have been omitted to expose the pedestal 18 to view, and the guard or housing 39 has been omitted to expose the reverse travel producing cylindrical member 23.

Upon now referring to the remaining figures of the drawings, it will be noted, as is more clearly shown in Figure 3, that the rockable enclosing housing 21 is mounted to rock upon the pedestal 18 about an axis parallel to and in substantially horizontal alignment with the axis of the power delivery means 24, and that the forward and reverse travel producing cylindrical members 22 and 23 are arranged at substantially equal distances above and below this horizontal line so that as the enclosing housing 21 is rocked in the manner above described, these travel producing cylindrical members 22 and 23 will be brought into driving relation with the power delivery means 24 to effect either a forward or reverse travel of the vehicle, depending upon in which direction the enclosing housing 21 is rocked either by an operation of the manually controlled lever 25 or by the foot operated platform 27.

As is more clearly shown in Figure 4 of the drawings, the enclosing housing 21 is completed by a back plate 42 that has a rearwardly extending cylindrical portion 43 that is journaled within the upper end of the pedestal 18 and through which the power take-off or driving shaft 19 extends. In this particular arrangement the driving shaft 19 is shown as journaled in a conventional manner within the cylindrical portion 43 of the back plate 42 by means of ball bearings, and at its outer end the driving shaft 19 carries a sprocket 44 about which the driving chain 20, previously described, is adapted to run. At its inner end the driving shaft 19 extends through the back plate 42 of the enclosing housing 21 where it carries a second chain engaging sprocket 45. In this view the chain, which engages the sprocket 45, as will hereinafter appear, has been omitted. The front portion of the enclosing housing 21 is also here shown as having two outwardly extending cylindrical supports within which shafts 46 and 47, that carry the forward and reverse travel producing cylindrical members 22 and 23, are journaled. The shafts 46 and 47 are journaled within these extending cylindrical supports of the enclosing housing 21 by means of ball bearings in a conventional manner, and the forward and reverse travel producing cylindrical members 22 and 23 are keyed upon the outer ends of these shafts. At its inner end the shaft 46 carries a chain engaging sprocket 48, and the shaft 47 likewise carries a similar chain engaging sprocket 49 at its inner end. Immediately above and in the plane of the sprockets 45, 48 and 49, here described as respectively carried by the driving shaft 19 and the shafts 46 and 47, there is an adjustable chain tightening sprocket 50 that is eccentrically mounted upon a stud 51 which can be turned to effect an adjustment in the tightness of a power transmitting chain which, in Figure 5 of the drawings, is designated by the numeral 52. This chain 52 is shown as disposed over and extends around the sprockets 45, 48, 49 and 50 in such a manner as to complete a driving connection between the sprocket 45 and the sprockets 48 and 49 so that the desired direction of rotation will be imparted to the driving shaft 19 when the enclosing housing 21 is rocked to bring either one of the forward or reverse travel producing cylindrical members 22 or 23 into driving engagement with the cylindrical power delivery means 24. These latter members and means are here shown by dot and dash lines to indicate the proximity of the co-operating elements when the enclosing housing 21 is in its neutral position. At this point it should also be noted that the forward and reverse travel producing cylindrical members 22 and 23 have spirally arranged spoke-forming webs 53 and 54 that will serve to maintain a circulation of cooling air therethrough while the driving means is in motion.

For the purpose of holding the enclosing housing 21 in its neutral position, as is shown in the several figures of the drawings, the pedestal 18 also carries an outwardly disposed cylindrical housing 55 in which there is mounted a roller carrying plunger 56 that is biased, by means of a compression spring 57, against a cam-like surface 58 formed in the outer surface of the cylindrical portion 43 carried by the back plate 42 of the enclosing housing 21.

It is believed that the operation of my improved power transmitting device will be understood from the above description. However, it may be added that in the preferred arrangement the power delivery means or cylinder 24 will be driven in a counter-clockwise direction, as viewed in Figure 5 of the drawings. Therefore, when the forward travel producing cylindrical member 22 is brought into engagement therewith by a counter-clockwise rocking of the enclosing housing 21, the power transmitting chain 52 will be driven in an overall clockwise direction and this will impart a clockwise direction of rotation to the sprocket 45 and cause the driving shaft 19 to be turned in a corresponding direction and cause the driving chain 20 to transmit a forward travel producing rotation of the driving wheel 12. When the enclosing housing 21 is rocked in the opposite or a clockwise direction, the reverse travel producing cylindrical member 23 will be rotated in a clockwise direction and, because of the disposition of the chain 52 about the sprocket 49, the sprocket 45 will be driven in a counter-clockwise direction and impart a corresponding direction of rotation to the power take-off or driving shaft 19 which will be transmitted through the chain 20 to the driving wheel 12 and thus cause the vehicle or truck to move backward. It will also be understood that should the chain 52 become too loose or too tight, its tension can be readily adjusted by changing the eccentricity of the sprocket 50 by a turning of the eccentric stud 51.

While I have, for the sake of clearness and in order to disclose the invention so that the same can be readily understood, described and illustrated specific devices and arrangements, I desire to have it understood that the invention is not necessarily limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In a reversible drive for a prime mover unit, the combination of a prime mover unit having an extending power delivery means, a power take-off shaft disposed in spaced relation with said power delivery means, a housing journaled about the axis of said power take-off shaft, a forward travel controlling member carried by and extending from said housing, a reverse travel controlling member also carried by and extending from said housing, said housing being mounted to rock about the axis of said power take-off shaft and carry said forward or said reverse travel controlling members into engagement with said power delivery means, a sprocket connected with each of said forward and reverse travel controlling members and said power take-off shaft mounted within said housing, an idling sprocket also mounted within said housing in co-planar relation with the aforementioned sprockets, means operable to rock said housing and place said forward or reverse travel controlling members into driving engagement with the extending power delivery means of said prime mover unit, and a single power transmitting chain arranged and disposed about said sprockets in a direction that will cause said power take-off shaft to be driven in a forward or reverse direction as one or the other of said forward and reverse travel controlling members are brought into driving engagement with said power delivery means.

2. In a reversible drive for a prime mover unit, the combination of a prime mover unit having an extending power delivery means, a power take-off shaft disposed in spaced relation with said power delivery means, a housing journaled about the axis of said power take-off shaft, a forward travel controlling member carried by and extending from said housing, a reverse travel controlling member also carried by and extending from said housing, said housing being mounted to rock about the axis of said power take-off shaft and carry said forward or said reverse travel controlling members into engagement with said power delivery means, a sprocket connected with each of said forward and reverse travel controlling members and said power take-off shaft mounted within said housing, an idling sprocket also mounted within said housing in co-planar relation with the aforementioned sprockets, means operable to rock said housing and place said forward or reverse travel controlling members into driving engagement with the extending power delivery means of said prime mover unit, a single power transmitting chain arranged and disposed about said sprockets in a direction that will cause said power take-off shaft to be driven in a forward or reverse direction as one or the other of said forward and reverse travel controlling members are brought into driving engagement with said power delivery means, and means forming an adjustable mounting for said idling sprocket and extending from said housing, whereby the position of said idling sprocket with respect to said other sprockets may be changed to thereby adjust the tightness of said power transmitting chain.

3. In a reversible drive for a prime mover unit, the combination of a prime mover unit having an extending power delivery means, a power take-off shaft disposed in spaced relation with said power delivery means, a sprocket enclosing housing journaled to rock about the axis of said power take-off shaft, a forward travel producing member journaled upon and extending from said housing and adapted to engage said cylindrical power delivery means when said housing is rocked in one direction, a reverse travel producing member also journaled upon and extending from said housing and adapted to engage said extending power delivery means when said housing is rocked in a reverse direction, a sprocket carried by each of said forward and reverse travel producing members and said power take-off shaft and disposed within said housing, an idling sprocket also disposed within said housing in co-planar relation with the aforementioned sprockets, means operable to rock said sprocket enclosing housing about the axis of said power take-off shaft, a single power transmitting chain disposed about all of said sprockets in a direction that will cause said power take-off shaft to be driven in a forward or reverse direction as one or the other of said forward and reverse travel producing members are brought into engagement with said power delivery means, and means normally operating to bias said enclosing housing and said forward and reverse travel producing members into a neutral position with respect to said power delivery means.

4. The combination in a drive of the character described of, a pair of driving sprockets, means for optionally imparting a corresponding direction of driving rotation to each of said driving sprockets, a driven sprocket mounted adjacent said driving sprockets, an idling sprocket adjacent said driving sprockets, and a single sprocket encircling chain disposed about said driving sprockets, said driven sprocket and said idling sprocket, whereby said driven sprocket will be driven in a different direction depending upon which of said driving sprockets is rotated by said first means.

5. In a drive of the character described, the combination of a prime mover unit, a pair of driving sprockets adapted to be alternately driven in the same direction of rotation by said prime mover unit, a driven sprocket positioned in cooperating relation with said driving sprockets, a sprocket chain extending around said driven sprocket and portions of each of said driving sprockets, and an idling sprocket associated with said driving chain adapted and arranged to dispose said chain about said two driving sprockets and said driven sprocket in a manner that will drive said driven sprocket in opposite directions depending upon which of said pair of driven sprockets is driven by said prime mover unit.

JOHN LANDON WATERS.

REFERENCES CITED

The following references are of record in the file of this patent:

UNITED STATES PATENTS

| Number | Name | Date |
|---|---|---|
| 706,027 | Crosby | Aug. 5, 1902 |
| 905,022 | Tiley | Nov. 24, 1908 |
| 846,212 | Johnson | Mar. 5, 1907 |
| 982,451 | Wagner | Jan. 24, 1911 |
| 2,336,642 | Schreck | Dec. 14, 1943 |
| 1,349,939 | Blacker | Aug. 17, 1920 |
| 243,526 | Dickinson | June 28, 1881 |
| 631,438 | Plass | Aug. 22, 1899 |